United States Patent [19]

Dokuzovic et al.

[11] Patent Number: 4,822,622

[45] Date of Patent: Apr. 18, 1989

[54] STABILIZED CHEWING GUM PRODUCT AND METHOD OF MAKING SAME

[75] Inventors: Zdravko Dokuzovic, Mississauga; Zoltan Bodor, Pickering, both of Canada

[73] Assignee: Warner-Lambert Co., Morris Plains, N.J.

[21] Appl. No.: 79,861

[22] Filed: Jul. 30, 1987

[51] Int. Cl.$^4$ .............................................. A23G 3/30
[52] U.S. Cl. ...................................... 426/5; 426/548; 426/249; 426/804
[58] Field of Search ....................................... 426/3-6, 426/249, 548, 804

[56] References Cited

U.S. PATENT DOCUMENTS

| | | | |
|---|---|---|---|
| 810,210 | 1/1906 | Laws | 426/5 |
| 1,193,423 | 8/1916 | Pryor | 426/5 |
| 1,771,981 | 7/1930 | Mustin | 426/5 |
| 1,771,982 | 7/1930 | Mustin | 426/5 |
| 2,304,246 | 12/1942 | Ekert | 426/5 |
| 3,928,633 | 12/1975 | Shoaf et al. | 426/96 |
| 3,956,507 | 5/1976 | Shoaf et al. | 426/96 |
| 3,962,463 | 6/1976 | Witzel | 426/5 |
| 3,969,513 | 7/1976 | Canonne | 426/5 |
| 4,004,039 | 1/1977 | Shoaf et al. | 426/548 |
| 4,122,195 | 10/1978 | Bahoshy et al. | 426/3 |
| 4,139,639 | 2/1979 | Bahoshy et al. | 426/3 |
| 4,246,286 | 1/1981 | Klose et al. | 426/3 |
| 4,352,824 | 10/1982 | Puglia et al. | 426/5 |
| 4,374,858 | 2/1983 | Glass et al. | 426/5 |
| 4,384,004 | 5/1983 | Cea et al. | 426/3 |
| 4,485,118 | 11/1984 | Carroll et al. | 426/5 |
| 4,556,565 | 12/1985 | Arima et al. | 426/3 |
| 4,590,075 | 5/1986 | Wei et al. | 426/5 |
| 4,656,039 | 4/1987 | Weiss et al. | 426/5 |

FOREIGN PATENT DOCUMENTS 2177587A  1/1987  United Kingdom .

*Primary Examiner*—Jeanette Hunter
*Attorney, Agent, or Firm*—Gary M. Nath

[57] ABSTRACT

A stabilized chewing gum product containing an L-aspartic acid derived sweetener and method for manufacture thereof are disclosed. The chewing gum product includes at least two portions, one of which includes Aspartame (APM) as an artificial, low calorie sweetener. A second portion can include a gum base and flavoring agents, preferably aldehyde flavorings. The portions are provided to opposite sides of a protective barrier film that is disposed between the two portions, whereby contact between the APM and the flavorings of the second portion is substantially reduced. The stability of APM and, consequently, of the chewing gum product is substantially increased.

33 Claims, 3 Drawing Sheets

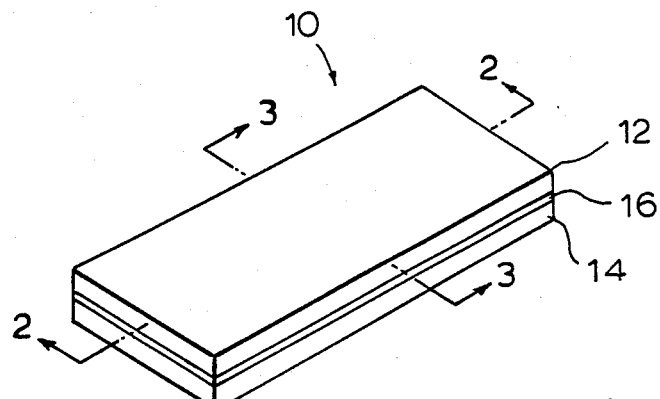
Fig. 1
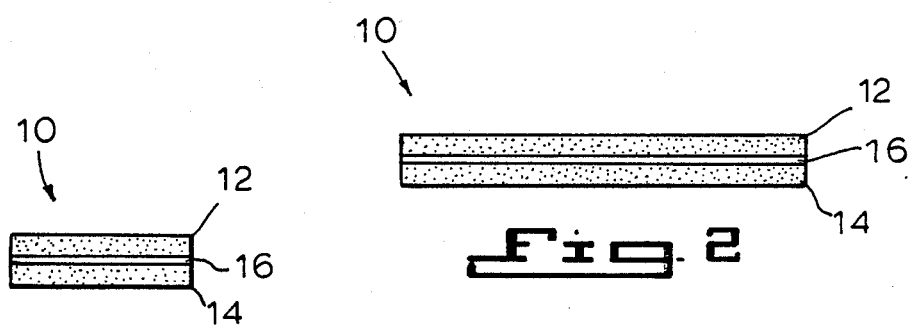
Fig. 2
Fig. 3
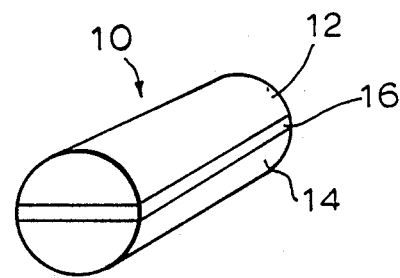
Fig. 4
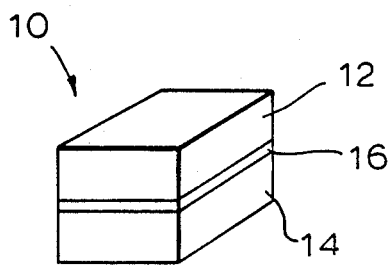
Fig. 5

STABILIZED CHEWING GUM PRODUCT AND METHOD OF MAKING SAME

This invention relates to chewing gum products with improved stability toward L-aspartic acid derived sweeteners. More particularly, this invention relates to a gum product of overall increased stability due to coextrusion or colayering of at least two separate portions which are separated by a barrier impervious to flavorings and/or moisture.

In recent years, Aspartame has been employed as an artificial, low calorie sweetener in chewing gum compositions. However, chewing gum compositions employing Aspartame have characteristically exhibited impractical levels of instability. Instability may manifest itself in a number of different ways, such as by staling and by noticeable changes in texture, taste, color and the like. The instability of chewing gum compositions containing Aspartame is primarily attributable to the instability of Aspartame itself in heterogeneous environments which include, among other things, flavorings, especially aldehyde-based flavorings, and moisture components. Thus, one problem encountered by those skilled in the art of sugarless chewing gum compositions that employ Aspartame as a sweetener is the degradation of Aspartame due to the presence of aldehydes, which are used as flavorings, moisture components, and pH levels at which Aspartame exhibits instability, such as above about 4.5. This instability and other problems associated with Aspartame are due to the wettability of the Aspartame crystal, as well as to its morphological configuration. More specifically, hydrolysis of aspartame results in the formation of Schiff Bases. Also, Aspartame decomposes to phenylalanine and diketopiperazine (DKP) in the presence of aldehydes.

Numerous attempts in the art to stabilize Aspartame in chewing gum compositions have been disclosed. One attempt to stabilize Aspartame is by encapsulating it with a variety of formulated coatings. For instance, U.S. Pat. No. 4,590,075 to Wei, et al. discloses a flavor and sweetener delivery system comprising sweetening agents, one of which is Aspartame, encapsulated in a matrix comprising at least one elastomer; at least one elastomer solvent; at least one wax system; an excipient selected from the group consisting of carbohydrates, polyhydric alcohols and mixtures thereof; and, optionally, spherical particles having microporous channels.

U.S. Pat. No. 4,556,565 to Arima, et al. discloses an encapsulated sweetener composition of L-aspartyl-L-phenylalanine methyl ester (APM) employed in a chewing gum base to form a chewing gum composition. The chewing gum composition also includes hydrogenated starch hydrolysate and/or hydrogenated maltose and a sugar alcohol, while the gum base excludes calcium carbonate and talc and includes microcrystalline cellulose in lieu thereof.

U.S. Pat. No. 4,485,118 to Carroll, et al. discloses a gum composition and method for making same, which contains a sequentially releasable plural flavor system comprised of different flavors. One of the flavors is encapsulated within a water-insoluble coating. A separate liquid flavor is introduced individually and is available for immediate release.

U.S. Pat. No. 4,384,004 to Cea, et al. discloses the encapsulation of the artificial sweetener L-aspartyl-L-phenylalanine methyl ester (APM) within a coating material including cellulose ethers, cellulose esters, certain vinyl polymers, gelatin and zein, in a ratio of coating material to APM of 1:1 or less. The stabilized APM is particularly suited for incorporation into chewing gum formulations.

U.S. Pat. No. 4,139,639 to Bahoshy, et al. discloses the fixing or encapsulating of L-aspartyl-L-phenylalanine methyl ester (APM) in order to retard and/or prevent the conversion of APM to diketopiperazine (DKP), under certain moisture, temperature and pH conditions which can effect a chewing gum system.

U.S. Pat. Nos. 4,004,039, 3,956,507 and 3,928,633, each to Shoof, et al., disclose a sweetening composition wherein APM is discretely dispersed throughout a matrix created by melting a fuseable mass and subdividing it to encapsulate the APM therein. The sweetening composition of the disclosures are applicable to food mixes and patentees are not particularly concerned with chewing gum compositions.

U.S. Pat. No. 3,962,463 to Witzel discloses a chewing gum having an acceptable flavor but with a substantially reduced content of flavoring ingredients, obtained by impregnating or depositing solid flavor particles, such as microencapsulated flavor particles or flavors sorbed on an edible substrate, on the surface of the gum.

While the encapsulation or coating technique of stabilizing Aspartame has been successful to a limited degree, it does suffer a variety of disadvantages, since flavor aldehydes still penetrate the encapsulate and destabilize Aspartame. Aspartame is known to be rod-like, needle-like or dendritic in shape. As a result, it is very difficult to coat Aspartame using ordinary mixing or spray coating techniques. To be effective as protective barriers, coatings must be able to wet and adhere to the crystalline surface, including the needle-like tips and other shape variations of the Aspartame. Additionally, the coating must be capable of being applied in a film with a uniform thickness sufficient to provide a barrier against degradative factors such as moisture, pH changes, temperature changes and reactive chemicals. The coatings, in addition to being protective barriers, must be flexible enough to conform to the surface irregularities and geometrical configuration without cracking due to mechanical stresses which it is subjected to during incorporation of the sweetener into specific products.

It has been discovered that simple mixing of known materials, such as fats, with certain other core materials, such as Aspartame, does not provide adequate protection to keep the core material in a stabilized state. Fats have not been found to provide adequate coating materials, nor have such coating materials as starch and certain other materials such as waxes. Many of these materials require solvents and moisture for application, which have adverse effects on the stability of hydrophilic instable materials such as Aspartame. For example, simple mixing of Aspartame in liquid mixtures of traditional coating materials, e.g., fat and lecithin, has resulted in poor wetting, spotty coating and inadequate protection against moisture and chemicals. The result is degradation of the Aspartame upon exposure to these conditions. Changes in pH and temperature catalyze these degradative conditions.

Other shortcomings associated with encapsulates is that the gum compositions in which they are employed are initially organoleptically unsatisfying, since encapsulates shield the sweetener, i.e., Aspartame, from the consumer's tongue.

Other attempts at stabilizing Aspartame in chewing gum compositions are disclosed in U.S. Pat. No. 4,374,858 to Glass, et al. wherein the sweetness stability of an Aspartame sweetened chewing gum is enhanced by coating the Aspartame onto the surface of the chewing gum piece; U.S. Pat. No. 4,246,286 to Klose, et al. discloses a sweetened chewing gum composition which contains L-aspartyl-L-phenylalanine methyl ester (APM) in amounts up to 1.5% by weight of the total product. The reported improvement comprises a gum which has a pH of between 5.0 and 7.0 so that the degradation of APM to diketopiperazine is minimized and the storage stability of the gum is increased; and U.S. Pat. No. 4,122,195 to Bahoshy, et al. discloses a product and process in which L-aspartyl-L-phenylalanine methyl ester is fixed in the reaction product of a compound containing a polyvalent metallic ion, with an ungelatinized starch acid-ester of a substituted dicarboxylic acid whereby the decomposition rate of the L-aspartyl-L-phenylalanine methyl ester when employed in a chewing gum system is reduced.

U.K. patent application Ser. No. GB 2,177,587 A, discloses a chewing gum product structured in layer form, with all of the water sensitive components of the formulation being placed in a core layer and encased in outer layers of water insensitive materials. It is also disclosed that one or more flavorants may be used in the gum base employed as the shell layers, and that the core material may contain one or more flavorings.

In a copending application, a gum product is disclosed in which Aspartame is protected by being disposed in a separate gum portion. No provision is made to prevent migration of ingredients or to prevent degradation at the interface.

On the other hand, the chewing gum product of the present invention includes a coextruded or colayered gum including at least two separate portions, which are physically separated from each other by a protective barrier film that is substantially impervious to flavorings and/or moisture. Thus, in the present gum product Aspartame, is, in addition to being disposed in a portion separate and apart from those components which would degrade it, such as aldehyde-based flavorants and moisture components, also physically separated from such components by the protective barrier film.

SUMMARY OF THE INVENTION

The stabilized chewing gum product of this invention includes a first portion chewing gum composition comprising a gum base and an L-aspartic acid derived sweetener, at least a second portion chewing gum composition comprising a gum base and at least one flavoring agent and, a protective barrier film disposed between the first portion and the second portion in such a manner that the first portion and second portion are on opposite sides of the protective barrier film so that the L-aspartic acid derived sweetener of the first portion is present in the gum product substantially out of contact with the flavoring agents of the second portion. The portions can be layers of gum composition or other distinct gum portions which maintain integrity in the gum product. The arrangement of the chewing gum product of the present invention increases the stability of the L-aspartic acid derived sweeteners and, consequently, of the final gum product.

The method of forming the stabilized chewing gum product of this invention includes providing a first portion chewing gum composition comprising a gum base and an L-aspartic acid derived sweetener in the absence of added aldehyde-based flavoring agents, providing at least one second portion chewing gum composition comprising a gum base and flavorings, disposing the first portion on one side of a barrier, and disposing the second portion to the opposite side of the barrier, so that the barrier is interposed between the first portion and the second portion, whereby the L-aspartic acid derived sweetener(s) in the product is stabilized by preventing mutual contact between the L-aspartic acid derived sweetener(s) of the first portion and the flavorings of the second portion.

The chewing gum product of the present invention exhibits a variety of advantages resulting from the improved manner in which the L-aspartic acid derived sweeteners are stabilized.

For instance, additional amounts of L-aspartyl-L-phenylalanine methyl ester (APM) are not required to be added when formulating the gum product in order to compensate for destabilization of APM. Thus, when the gum product is being consumed, the desired concentration of APM will be available in the gum composition.

Additionally, the present gum product can include a normal and/or high moisture content without undergoing APM destabilization. Similarly, the present gum product can include aldehyde-based flavorings without suffering from the concomitant destabilization of APM.

If desired, free APM may be used as a sweetener without encapsulated APM. As such, the cost associated with the formulation of the present gum composition is relatively minimal.

Furthermore, the present gum product is organoleptically satisfying to the consumer, since immediate sweetness can be provided as well as sustained sweetness when, for example, encapsulated sweeteners are used in addition.

For a better understanding of the present invention, together with other and further objects, reference is made to the following description, taken in conjunction with the accompanying drawings, and its scope will be pointed out in the appended claims.

DESCRIPTION OF THE DRAWINGS

FIG. 1 is a perspective view of the present gum product in stick form;

FIG. 2 is a cross-sectional view of the present gum product taken along lines 2—2 of FIG. 1;

FIG. 3 is a cross-sectional view of the present gum product taken along lines 3—3 of FIG. 1;

FIG. 4 is a perspective view of an alternative embodiment of the present gum product in tubular form;

FIG. 5 is yet another alternative embodiment of the present gum product in chunk form;

DETAILED DESCRIPTION OF THE PREFERRED EMBODIMENT

Figure 6:
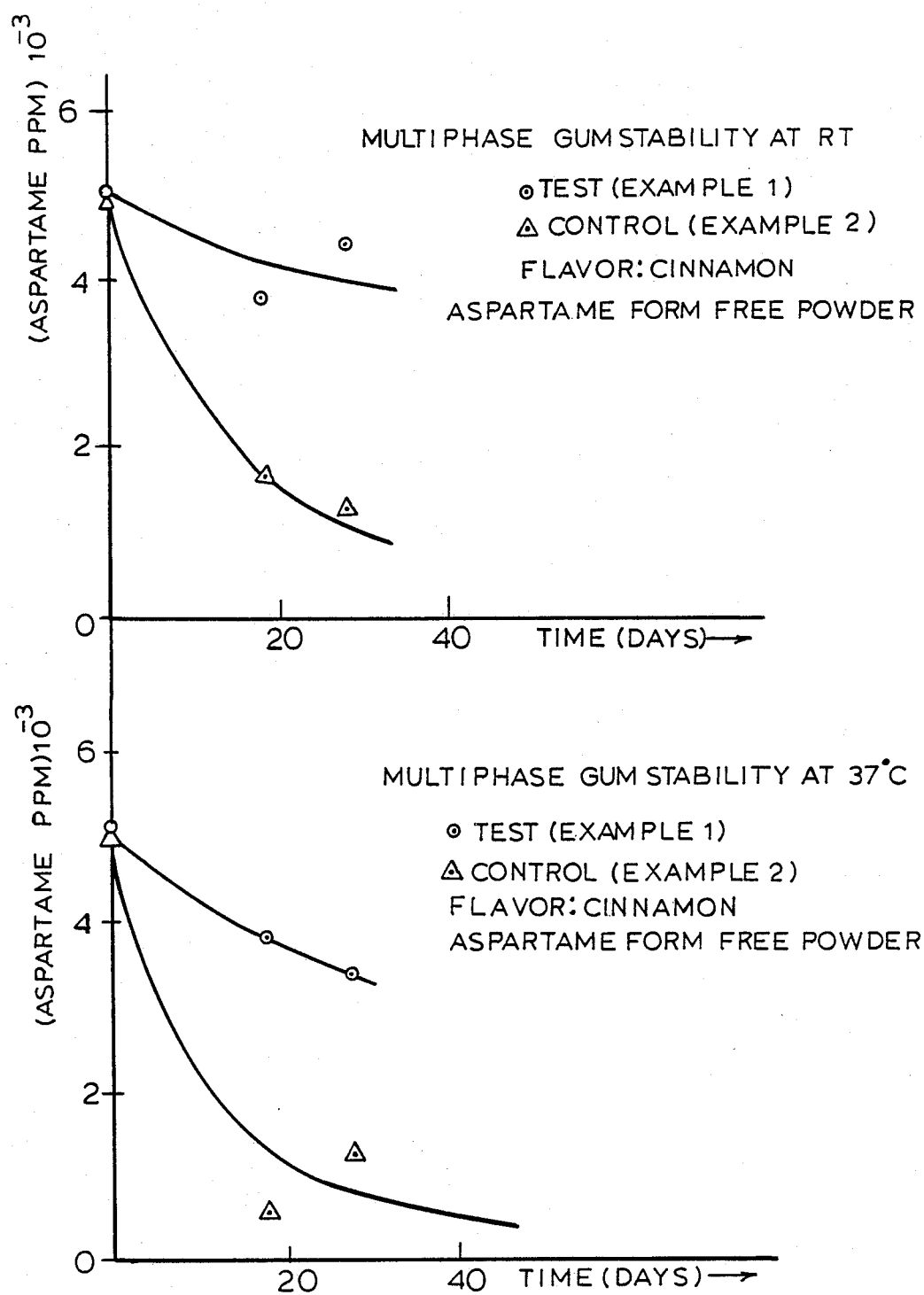
FIG. 6 graphically illustrates first order plots of APM Stability in the present chewing gum product and in a conventional chewing gum product, at room temperature and at 37° C.

Description of the Portion Containing the L-Aspartic Acid Derived Sweetener

Preferably, the chewing gum composition of the first portion, i.e., the sweetener containing portion, as well as the chewing gum composition of the portion that contains the flavorings, is substantially anhydrous. By substantially anhydrous, it is meant that there is less than about 2% by weight of moisture in the portion. Suitable chewing gum compositions having a relatively low moisture content are described in U.S. Pat. No. 4,514,422 to Yang et al., issued Apr. 30, 1985; U.S. Pat. No. 4,579,738 to Cherukuri et al., issued Apr. 1, 1986; U.S. Pat. No. 4,581,234 to Cherukuri et al., issued Apr. 8, 1986; and U.S. Pat. No. 4,587,125 to Cherukuri et al., issued May 6, 1986; the disclosures of each being incorporated herein by reference thereto.

The gum base used may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, natural rubber, jelutong, balata, gutta percha, lechi caspi, sorva, guttakay, perillo, crown gum and mixtures thereof. Synthetic elastomers such as butadiene-styrene copolymers, isobutylene-isoprene copolymers, polyethylene, polyisobutylene and poly-vinylacetate and mixtures thereof, are particularly useful.

The gum base can contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood or gum rosin, pentaerythritol ester of wood or gum rosin, glycerol ester of wood or gum rosin, glycerol ester of partially dimerized rosin, glycerol ester of polymerized rosin, glycerol ester of tall oil rosin, glycerol ester of wood or gum rosin and partially hydrogenated wood or gum rosin and partially hydrogenated methyl ester of rosin, such as polymers of alpha-pinene or beta-pinene; terpene resins including polyterpene and mixtures thereof. The elastomer solvent may be employed in an amount ranging from about 10% to about 75% and, preferably, about 45% to about 70% by weight of the gum base.

A variety of traditional ingredients may be incorporated in the gum base, such as plasticizers or softeners. Examples of these ingredients include lanolin, stearic acid, sodium stearate, potassium stearate, glyceryl triacetate, glycerine, lecithin, glyceryl monostearate and the like. Natural waxes, petroleum waxes, polyurethane waxes, paraffin waxes and microcrystalline waxes may also be incorporated into the gum base to obtain a variety of desirable textures and consistency properties. Mixtures of these traditional ingredients are also contemplated. These traditional ingredients are generally employed in amounts of up to about 30% by weight and, preferably, in amounts of from about 3% to about 20% by weight of the final chewing gum product.

The sweetener containing portion of the present chewing gum product may additionally include the conventional additives of coloring agents such as titanium dioxide; emulsifiers such as lecithin and glyceryl monostearate; and additional fillers such as aluminum hydroxide, alumina, aluminum silicates, calcium carbonate, dicalcium phosphate, talc, and combinations thereof. These fillers may also be used in the gum base in various amounts. Usually, when present, these fillers are used in amounts up to about 30% by weight of said gum product. Preferably, the amount of fillers, when used, will vary from about 4% to about 30% by weight of the final chewing gum product.

The gum base used in the L-aspartic acid derived sweetener containing portion may be employed in quantities from about 5% to about 50%, preferably from 15% to about 40% and, most preferably, from about 20% to about 30% by weight of the final chewing gum product.

The sweetener containing portion of the present chewing gum product contains an L-aspartic acid derived sweetener in an amount effective to provide the level of sweetness desired. The preferred embodiment includes L-aspartyl-L-phenylalanine methyl ester (APM) as a sweetener, the preparation of which is set forth in U.S. Pat. No. 3,492,121, incorporated herein by reference. Other examples of L-aspartic acid derived sweeteners include L-$\alpha$-aspartyl-N-(2,2,4,4-tetramethyl-3-thiethanyl)-D-alaninamide hydrate; methyl esters of L-aspartyl-L-phenylglycine and L-aspartyl-L-2,S,dihydrophenylglycine; L-aspartyl-2,5-dihydro-L-phenylalanine; L-aspartyl-L-(1-cyclohexy-en)alanine; and the like.

The problem with APM is that APM displays sensitivity when it is exposed to elevated temperatures, moisture, certain pH conditions and certain other food ingredients, including flavorings, especially aldehyde-based flavorings. Such exposure causes APM to break down to the corresponding diketopiperazine (DKP), which is evidenced by a proportionate decrease in sweetness.

APM, or other L-aspartic acid derived sweeteners, can be employed in the sweetener-containing gum composition as a free sweetener whether used alone or in combination with other sweeteners and/or encapsulated APM. Free APM, or other L-aspartic acid derived sweetener, may be used in amounts of about 0.01% to about 2.0% by weight of the final chewing gum product. Preferably, APM is employed in an amount of about 0.01% to about 1.0% and, most preferably, in an amount of about 0.01% to about 0.4% of the final chewing gum product. Auxiliary sweeteners may be used to complement APM and may be employed in conventional amounts based on the total weight of the chewing gum product, as is standard in the art. For instance, a preparation of APM-containing sweeteners are disclosed in U.S. Pat. No. 4,556,565 to Arima, et al. However, the present invention is distinguished from the disclosure of U.S. Pat. No. 4,556,565 which describes an APM-containing gum composition wherein an attempt to stabilize the APM is undertaken by replacing calcium carbonate with microcrystalline cellulose powder.

Optionally, other sweetening agents (sweeteners) can be used in conjunction with the APM or other L-aspartic acid derived sweeteners in amounts sufficient to complement the sweetness of the APM or other L-aspartic acid derived sweeteners. It is also contemplated that these other sweeteners may be used in amounts sufficient to provide a desired level of sweetness in which the level of sweetness is enhanced by the amount of APM or other L-aspartic acid derived sweeteners used. These other sweeteners include water-soluble sweetening agents, water-soluble artificial sweeteners, water-soluble sweetening agents derived from naturally occurring water-soluble sweeteners, protein based sweeteners, mixtures thereof, and the like. Without being limited to particular sweeteners, representative illustrations of these other sweeteners include:

A. Water-soluble sweetening agents such as monosaccharides, disaccharides and polysaccharides such as xylose, ribose, glucose (dextrose), mannose, galactose, fructose (levulose), sucrose (sugar), maltose invert sugar (a mixture of fructose and glucose derived from sucrose), partially hydrolyzed starch, corn syrup solids, dihydrochalcones, monellin, steviosides, glycyrrhizin, and sugar alcohols such as sorbitol, xylitol, mannitol, maltitol, hydrogenated starch hydrolysate and mixtures thereof;

B. Water-soluble artificial sweeteners such as the soluble saccharin salts, i.e., sodium or calcium saccharin salts, cyclamate salts, acesulfame-K and the like, and the free acid form of saccharin;

C. Water-soluble sweeteners derived from naturally occurring water-soluble sweeteners, such as a chlorinated derivative of ordinary sugar (sucrose), known, for example, under the product designation of sucralose; and D. Protein based sweeteners such as thaumatin.

These other sweeteners, when used, are used in amounts effective to provide the desired end result and such amounts may vary with the sweetener selected. For example, for an easily extractable sweetener the amounts can range from about 0.01% to about 90% by weight of the final chewing gum product. The water-soluble sweeteners described in category A above can be used in amounts up to about 75% by weight of the final chewing gum product with about 25% to about 75% by weight being suitable. Some of the sweeteners in category A (e.g., glycyrrhizin) may be used in amounts set forth for categories B-D below due to the sweeteners known sweetening ability. The sweeteners in categories B-D can be used in amounts of about 0.005% to about 5.0% and, preferably, about 0.05% to about 2.5% by weight of the final chewing gum product. The amounts selected for use in conjunction with the L-aspartic acid derived sweeteners are those which will provide a desired level of sweetness independent from the flavor level achieved from the flavorings used.

The sweetener containing portion of the present chewing gum product can also contain an encapsulated APM sweetener used alone or in cooperation with free APM. APM may be encapsulated by a variety of coating techniques, including spray drying, coacervation, and the like. Preferably, the APM is encapsulated by a method that operates in similar fashion to fluidized bed coating processes, in that particles of APM are suspended in an apparatus that creates a strong upward air current or stream in which the particles move. The stream passes through a zone of finely atomized droplets of the coating material or encapsulant, after which the thus coated particles pass out of the upward stream and pass downward in a fluidized condition countercurrent to a flow of heated fluidized gas whereupon they are aired, and may reenter the upward-moving coating zone for a subsequent discrete coating application. The foregoing method and associated apparatus are known as the Wurster Process. The Wurster Process and its associated apparatus are set forth in detail in the following U.S. Patents: U.S. Pat. Nos. 3,089,824; 3,117,027; 3,196,827; 3,241,520; and 3,253,944.

Description of the Portion that Contains the Flavorings

This particular portion of the present chewing gum product also includes a gum base. The preceding description regarding the gum base employed in the portion containing the L-aspartic acid derived sweetener applies equally as well herein.

Thus, in brief reiteration, the gum base is primarily fabricated from the suitable polymers described. Additionally, as previously described, the gum base can contain elastomer solvents, plasticizers, softeners, coloring agents, emulsifiers and fillers.

As stated above, the chewing gum composition of this portion is preferably substantially anhydrous, however, portion may contain less than about 5% by weight, based on the weight of this portion, of water.

This particular portion of the present chewing gum product also includes flavoring components. The flavorings employed in this portion include those known to the skilled artisan, such as, natural and artificial flavors. These flavorings may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds, and cassia oil. Also useful are artificial, natural or synthetic fruit flavors such as vanilla, and citrus oil, including lemon, orange, grape, lime and grapefruit and fruit essences including apple, pear, peach, strawberry, raspberry, cherry, plum, pineapple, apricot and so forth. These flavorings may be used individually or in admixture. Commonly used flavors include mints such as peppermint, menthol, artificial vanilla, cinnamon derivatives, and various fruit flavors, whether employed individually or in admixture. The flavorings are generally utilized in amounts that will vary depending upon the individual flavor, and may, for example, range in amounts of about 0.005% to about 5% by weight of the final chewing gum composition and, preferably, about 0.2% to about 3% by weight and most preferably about 0.4 to about 2.5% by weight.

Separation of the L-aspartic acid derived sweetener into one portion and the flavorings into another portion and interposing a protective barrier between the two respective portions, as stated above, results in improved stability of the L-aspartic acid derived sweetener. In particular, the improved stability is demonstrated when aldehyde-based flavorings (flavors), which are known to degrade L-aspartic acid derived sweeteners, are used.

Examples of suitable aldehyde flavors include, but are not limited to: acetaldehyde (apple); benzaldehyde (cherry, almond); anisic aldehyde (licorice, anise); cinnamic aldehyde (cinnamon); citral, i.e., alpha citral (lemon, lime); neral, i.e., beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese) valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., Melonal (melon); 2,6-dimethyloctanal (green fruit); and, 2-dodecenal (citrus, mandarin).

Preparation of the Protective Barrier

In the final chewing gum product, a protective barrier film is interposed between the portion containing the L-aspartic acid derived sweetener and the portion which contains the flavorings. This film acts as a protective barrier, that is, it prevents any of the aldehyde flavors, or any other flavors, from migrating from the portion that is devoid of the L-aspartic acid derived sweetener into the portion that contains the sweetener, thereby alleviating the otherwise deteriorative effect that the flavorings would have on the sweetener and, as a result, the final chewing gum product.

The protective barrier film can be fabricated from any known film forming materials in amounts effective to form a film and to impart hydrophillic properties to the thus formed film. The film is substantially impervious to the flavorings employed, so as to prevent passage of any flavor oils or aldehyde flavorings through the barrier film. Generally, the materials used to form the film are water or alcohol (ethanol) soluble and gel forming. Thus, the materials are dissolved in a sufficient amount of solvent (water or alcohol) to solubilize the material, usually about 5% to about 90% by weight of the film solution of water is sufficient.

As merely illustrative, the protective barrier film can be formed from materials selected from the group consisting of: Gelatine; Acacia Gum; Agar; Algin and Derivatives; Carrageenan and salts thereof; Arabinogalactan; Baker Yeast Glycan; Carboxymethylcellulose; Carob Bean Gum; Cellulose Gum; Furcellaran and salts thereof; Guar Gum; Gum Arabic; Hydroxypropyl Cellulose; Hydroxypropyl Methyl Cellulose; Irish Moss Gelose; Karaya Gum; Locust Bean Gum; Methylcellulose; Methylethyl Cellulose; Pectin; Propylene Glycol Alginate; Propylene Glycol Ether of Methyl Cellulose; Sodium Carboxy Methyl Cellulose; Tragacanth Gum; Xanthan Gum; shellac; and mixtures thereof.

Other requirements concerning those materials used to fabricate the protective film are that they must be comestible, masticatable and they cannot be organoleptically dissatisfying.

The film can be formed in any conventional manner. Thus, for example, the film can be formed by extruding, spraying, brushing, etc., any solvent solutions of any of the above-enumerated materials or blends thereof.

Once the film has been formed, it can be incorporated into the final gum product in amounts effective to provide a barrier between that portion containing the L-aspartic acid derived sweetener and that portion devoid of same, i.e. that portion containing the flavorings. Generally, the amount of protective barrier film disposed between the portions depends upon the characteristics of the film forming material being used. For example, the protective barrier film can be present in amounts up to about 10% by weight of the final chewing gum composition with from about 5% to about 10% by weight being preferred.

Preparation of the Chewing Gum Product

The present chewing gum product is prepared by first separately preparing each of the portions described above, namely, the portion containing the L-aspartic acid derived sweetener, the portion containing the flavorings and the protective barrier film. It is to be understood that while only two separate portions have been described, that is, the portion which contains the L-aspartic acid derived sweetener and the portion which contains the flavorings, the present chewing gum product must contain both of these portions at a minimum. Other portions can be included in the final gum product. Each additional portion can of course be provided with a composition suitable to provide the desired results. It is to be further understood, that the protective barrier film can be interposed between each additional portion.

After each of the respective portions have been separately prepared, in a manner which will be further understood by referring to the examples which follow, the portions can be mutually applied to opposite sides of the protective barrier film, that is, they can be colayered or coextruded onto opposite sides of the protective barrier film.

Referring now to the drawings where like parts are designated by like reference numerals, illustrated in FIGS. 1, 4 and 5 are various embodiments of the present chewing gum product. Referring particularly to FIGS. 1-3, gum product 10 includes upper portion 12, lower portion 14 and protective barrier film 16 which is interposed between upper portion 12 and lower portion 14.

Referring now to FIGS. 4 and 5, illustrated are alternative embodiments of the present gum composition, namely, a gum product in tubular form (FIG. 4) and a gum product in chunk form (FIG. 5). These alternative embodiments also include upper portion 12, lower portion 14 and protective barrier film 16.

While the drawings illustrate the present gum product in stick form, tubular form and chunk form, it is to be understood that other gum configurations can be used in accordance with the present invention.

The following examples serve to provide further appreciation of the invention but are not meant in any way to restrict the effective scope of the invention. Thus, while the preceding description and the following examples focus on a bi-layered gum composition, it is to be understood that the present invention also pertains to a gum product having more than two portions which can take the form of layers or other configurations such as square or round shaped tubes, etc.

In the examples that follow substantially anhydrous chewing gum compositions were used.

EXAMPLES 1 AND 2

A sample of the present gum product was prepared, in Example 1, utilizing the ingredients appearing in Table I in amounts corresponding to the designated weight percentages. In Example 2, a conventional, artificially sweetened gum composition was prepared in a manner where the ingredients are all disposed in a homogeneous environment. Thus, in the chewing gum product of Example 2 the flavor and APM were evenly distributed throughout the whole gum piece. In Example 1, the same amount of flavorings and APM were used as in Example 2, however, in Example 1, the APM and flavorings were each distributed in two separate and distinct portions according to the present chewing gum composition.

In Table I, layer A represents the layer or portion that is devoid of any L-aspartic acid derived sweetener, layer B represents the layer or portion that contains the L-aspartic acid derived sweetener, and layer C represents the layer or portion employed as the protective barrier film.

TABLE I

| | Layer | | |
|---|---|---|---|
| INGREDIENT | A % | B % | C % |
| GUM BASE | 28 | 28 | — |
| LECITHIN | — | 1.0 | — |

TABLE I-continued

| INGREDIENT | Layer A % | B % | C % |
|---|---|---|---|
| MANNITOL | 12.0 | 12.0 | — |
| SORBITOL | 41.92 | 35.4 | — |
| XYLITOL | 10.0 | 10.0 | — |
| GLYCERIN | 5.0 | 12.0 | 85.0 |
| CINNAMON FLAVOR | 3.0 | — | — |
| COLOR | 0.08 | — | — |
| APM (FREE POWDER)* | — | 0.6 | — |
| VEGETABLE OIL | — | 1.0 | — |
| GELATIN 150 BLOOM | — | — | 10.0 |
| WATER | — | — | 5.0 |

*Free powder APM was used instead of encapsulated APM to better test the enhanced stability of APM in the present gum product which physically separates the APM from the flavors. However, it is to be understood that use of encapsulated APM is within the scope of the present invention and, in fact, is preferred.

It was found that the level of sweetness in inventive Example 1 was sustained at a high level for a longer period of time than the product of Example 2.

Figure 7:
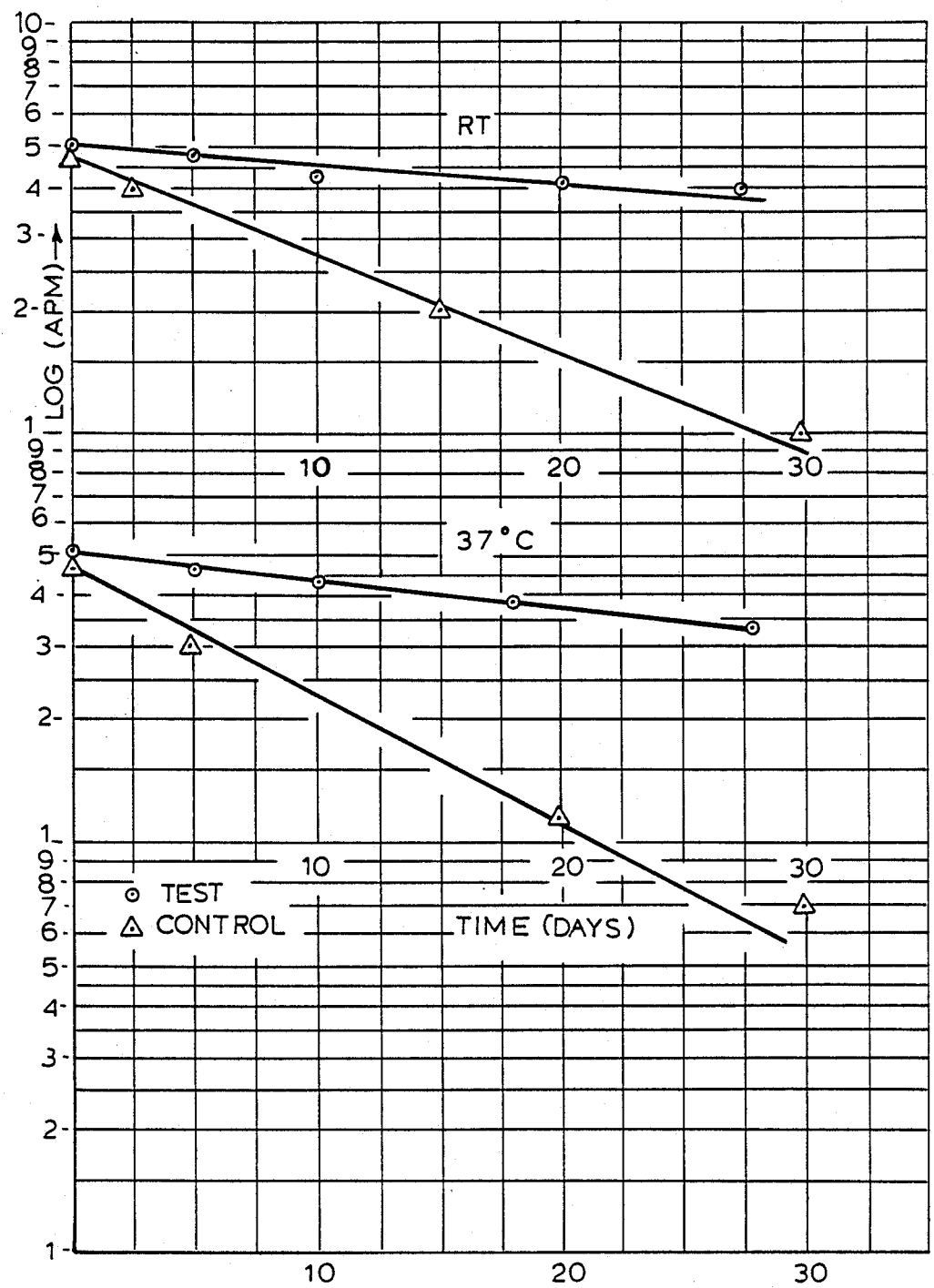
FIG. 7 graphically illustrates plots of the log of the stability of APM in the chewing gum products of FIG. 6 as a function of time.

The gum products of Examples 1 and 2 were each stored at two different temperatures, (22° C. and 37° C.) for 28 days. The concentration of APM for each gum product was initially determined, determined after 18 days, and then again after 28 days. From the three concentration measurements and at each temperature (22° C. and 37° C.) first order plots were estimated and the results are shown in FIG. 6. As this graphic illustration demonstrates, the concentration of APM in the gum product of Example 1 was greater than the concentration of APM in the gum product of Example 2. These plots were then converted to plots of the log [APM] vs. time and the results are reported in FIG. 7. The log of the concentration of APM in the gum product of Example 1 was greater than the log of the concentration of the gum product of Example 2. First order rate constants, which represent the rate of APM degradation, were obtained from the slopes of the resulting straight lines and appear below in Table II.

TABLE II

| | FIRST ORDER RATE CONSTANTS k(DAYS$^{-1}$) | | |
|---|---|---|---|
| TEMPERATURE | K (EXAMPLE 1) | K (EXAMPLE 2) | $K_2/K_1$ |
| RT | 0.011 | 0.057 | 5.2 |
| 37° C. | 0.015 | 0.075 | 5.0 |

As these data demonstrate, the rate of degradation of APM in the gum product of Example 2 is about 5 times the rate of degradation of APM in Example 1.

Those skilled in the art will appreciate that, unless indicated otherwise, all percents herein are percent by weight of the final chewing gum composition (product). Also, the total amount of all ingredients (components) used in the chewing gum compositions of this invention equals 100%.

Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A stabilized chewing gum product containing an L-aspartic acid derived sweetener which comprises:
   a first portion substantially anhydrous chewing gum composition comprising from about 5% to about 50% by weight of the final chewing gum product of a gum base and from about 0.01% to about 2.0% by weight of the final chewing gum product of an L-aspartic acid derived sweetener, wherein there is an absence of aldehyde-based flavoring agents in said first portion;
   at least a second portion chewing gum composition comprising from about 5% to about 50% by weight of the final chewing gum product of a gum base and an amount of about 0.005% to about 5% by weight of the final chewing gum composition of at least one flavoring agent, said second portion having less than about 5% by weight, based on the weight of said second portion, of water; and
   a protective barrier film in amounts effective to provide a barrier between said first portion and said second portion, said protective barrier film being fabricated from a material selected from the group consisting of: Gelatin, Acacia Gum; Agar; algin and Derivatives; Carrageenan and salts thereof; Arabinogalactan; Baker Yeast Glycan; Carboxymethylcellulose; Carob Bean Gum; Cellulose Gum; Furcellaran and salts thereof; Guar Gum; Gum Arabic; Hydroxypropyl Cellulose; Hydroxypropyl Methyl Cellulose; Irish Moss Gelose; Karaya Gum; Locust Bean Gum; Methylcellulose; Methylethyl Cellulose; Peptin; Propylene Glycol Alginate; Propylene Glycol Ether of Methyl Cellulose; Sodium Carboxy Methyl Cellulose; Tragacanth Gum; Xanthan Gum; shellac; and mixtures thereof, whereby said L-aspartic acid derived sweetener of said first portion is substantially out of contact with the flavoring agent, thereby increasing the stability of said L-aspartic acid derived sweetener in said chewing gum product.

2. The chewing gum product of claim 1 wherein said L-aspartic acid derived sweetener is in free form.

3. The chewing gum product of claim 1 wherein said L-aspartic acid derived sweetener is APm.

4. The chewing gum product of claim 1 wherein said protective barrier film is present in amounts up to about 10% by weight of the final chewing gum composition.

5. The chewing gum product of claim 1 wherein said chewing gum composition of said first portion is an anhydrous chewing gum composition.

6. The chewing gum product of claim 1 wherein said gum base includes an elastomer selected from the group consisting of chicle, jelutong, gutta percha, crown gum, butadiene-styrene copolymers, isobutylene-isoprene copolymers, polyethylene, polyisobutylene, polyvinyl acetate and mixtures thereof.

7. The chewing gum product of claim 1 wherein said gum base includes one or more elastomer solvents.

8. The chewing gum product of claim 7 wherein said one or more elastomer solvents are employed in an amount from about 10% to about 75% by weight of said gum base.

9. The chewing gum product of claim 7 wherein said one or more elastomer solvents are employed in an amount from about 45% to about 70% by weight of said gum base.

10. The chewing gum product of claim 1 wherein said flavoring agent is an aldehyde based flavoring agent, and said L-aspartic acid derived sweetener is APM.

11. The chewing gum product of claim 1 wherein said gum base is employed in said first portion and in said at least one second portion in an amount from about 15% to about 40% by weight of the final chewing gum product.

12. The chewing gum product of claim 10 wherein the protective barrier film is present in amounts up to about 10% by weight of the final chewing gum composition.

13. The chewing gum product of claim 1 wherein said L-aspartic acid derived sweetener is employed in said first portion in an amount from about 0.01% to about 1.0% by weight of said chewing gum product.

14. The chewing gum product of claim 1 wherein said L-aspartic acid derived sweetener is employed in said first portion in an amount from about 0.01% to about 0.4% by weight of said chewing gum product.

15. The chewing gum product of claim 1 wherein said first portion includes auxiliary sweeteners used to complement the L-aspartic acid derived sweetener.

16. The chewing gum product of claim 3 wherein said APM is encapsulated.

17. The chewing gum product of claim 15 wherein said auxiliary sweeteners are encapsulated.

18. The chewing gum product of claim 15 wherein said auxiliary sweeteners are selected from the group consisting of mannitol, sorbitol, xylitol, saccharin, cyclamate, dihydrochalcone, glycyrrhizin, stevioside, hydrogenated starch hydrolysate, acesulfame-K, monellin, L-α-aspartyl-N-(2,2,4,4-tetramethyl-3-thiethanyl)-D-alaninamide hydrate, a chlorinated derivative of sucrose and mixtures thereof.

19. The chewing gum product of claim 1 wherein said L-aspartic acid derived sweetener is prepared under substantially anhydrous conditions.

20. The chewing gum product of claim 1 wherein said flavorings are selected from the group consisting of peppermint, menthol, artificial vanilla, cinnamon derivatives, fruit flavors and admixtures thereof.

21. The chewing gum product of claim 1 wherein said flavorings in said second portion are aldehyde-based flavorings.

22. The chewing gum product of claim 21 wherein said aldehyde-based flavorings are selected from the group consisting of acetaldehyde, benzaldehyde, anisic aldehyde, cinnamic aldehyde, citral, neral, decanal, ethyl vanillin, heliotropine, vanillin, alpha-amyl cinnamaldehyde, butyraldehyde, valeraldehyde, citronellal, decanal, aldehyde C-8, aldehyde C-9, aldehyde C-12, 2-ethyl butyraldehyde, hexenal, tolyl aldehyde, veratraldehyde, 2,6-dimethyl-5-heptenal, 2,6-dimethyloctanal, 2-dodecenal and mixtures thereof.

23. The chewing gum product of claim 4 wherein said protective barrier film is present in amounts of from about 5% to about 10% by weight of the final chewing gum composition.

24. The chewing gum product of claim 1 wherein said flavorings are included in said at least one second portion in an amount from about 0.4% to about 2.5% by weight of said chewing gum product.

25. The chewing gum product of claim 1 further comprising additional incorporated materials selected from the group consisting of fillers, emulsifiers, coloring agents, plasticizers, softeners, waxes, bulking agents and mixtures thereof.

26. The chewing gum product of claim 25 wherein said additional incorporated materials are employed in amounts up to about 30% by weight of said gum product.

27. The chewing gum product of claim 1 which further comprises more than two layers.

28. The chewing gum product of claim 12 wherein said protective barrier film is present in amounts of from about 5% to about 10% by weight of the final chewing gum composition.

29. The chewing gum product of claim 10 wherein said APM is in the free form.

30. The chewing gum product of claim 10 wherein said APM is encapsulated.

31. A method of forming a stabilized chewing gum product having an L-aspartic acid derived sweetener which comprises:
   providing a first portion substantially anhydrous chewing gum composition comprising from about 5% to about 50% by weight of the final chewing gum product of a gum base and from about 0.01% to about 2.0% by weight of the final chewing gum product of an L-aspartic acid derived sweetener, wherein there is an absence of aldehyde-based flavoring agents in said first portion;
   providing at least one second portion chewing gum composition comprising from about 5% to about 50% by weight of the final chewing gum product of a gum base and an amount of about 0.005% to about 5% by weight of the final chewing gum composition of flavorings, said second portion chewing gum composition having less than about 5% by weight, based on the weight of said second portion, of water; and
   providing an effective amount of a barrier between said first portion and second portions, said barrier being fabricated from a material selected from the group consisting of: Gelatin, Acacia Gum; Agar; Algin and Derivatives; Carrageenan and salts thereof; Arabinogalactan; Baker Yeast Glycan; Carboxymethylcellulose; Carob Bean Gum; Cellulose Gum; Furcellaran and salts thereof; Guar Gum; Gum Arabic; Hydroxypropyl Cellulose; Hydroxypropyl Methyl Cellulose; Irish Moss Gelose; Karaya Gum; Locust Bean Gum; Methylcellulose; Methylethyl Cellulose; Pectin; Propylene Glcyol Alginate; Propylene Glycol Ether of Methyl Cellulose; Sodium Carboxy Methyl Cellulose; Tragacanth Gum; Xanthan Gum; shellac; and mixtures thereof, whereby the stability of said L-aspartic acid derived sweetener is substantially improved by preventing mutual contact between said L-aspartic acid derived sweetener of said first portion and said flavorings of said second portion.

32. The method of claim 31 wherein said barrier is provided by coextruding said portions onto opposite sides of said barrier to form said gum product.

33. The method of claim 31 wherein said L-aspartic acid derived sweetener is in free form.

* * * * *